(12) United States Patent
Zhang et al.

(10) Patent No.: US 6,828,972 B2
(45) Date of Patent: Dec. 7, 2004

(54) SYSTEM AND METHOD FOR EXPRESSION MAPPING

(75) Inventors: Zhengyou Zhang, Redmond, WA (US); Zicheng Liu, Bellevue, WA (US); Ying Shan, Plainsboro, NJ (US)

(73) Assignee: Microsoft Corp., Redmond, WA (US)

( * ) Notice: Subject to any disclaimer, the term of this patent is extended or adjusted under 35 U.S.C. 154(b) by 399 days.

(21) Appl. No.: 10/131,972

(22) Filed: Apr. 24, 2002

(65) Prior Publication Data

US 2004/0056857 A1 Mar. 25, 2004

(51) Int. Cl.⁷ .............................................. G06T 15/00
(52) U.S. Cl. ..................................................... 345/473
(58) Field of Search ................................ 345/473, 474, 345/475, 419, 427, 619, 629; 704/276; 382/100, 118

(56) References Cited

U.S. PATENT DOCUMENTS

| | | | | |
|---|---|---|---|---|
| 4,276,570 A | | 6/1981 | Burson et al. ............... | 358/903 |
| 5,689,618 A | * | 11/1997 | Gasper et al. ............... | 704/276 |
| 5,850,463 A | * | 12/1998 | Horii .......................... | 382/118 |
| 6,393,134 B1 | * | 5/2002 | Tostevin et al. ............ | 382/100 |

OTHER PUBLICATIONS

T. Beier and S. Neely. Feature–based image metamorphosis. In *Computer Graphics*, pp. 35–42. Siggraph, Jul. 1992.
Boissieux, G. Kiss, N.m. Thalman and P. Karla. Simulation of Skin Aging and Wrinkles with Cosmetic Insights. In *Computer Animation and Simulation 2000*,2000.
J. Blinn, Models of light reflection for computer synthesized pictures. In Computer Graphics, pp. 192–198, SIGGRAPH, Jul. 1977.
C. Choi, Age Change for Predicting Future Faces. In *IEEE International Fuzzy Systems Conference Proceedings*, pp. 1603–1608, 1999.
P. E. Debevec. Rendering synthetic objects into real scenes: Bridging traditional and image–based graphics with global illumination and high dynamic range photography. In *Computer Graphics, Annual Conference Series*, pp. 189–198, 1998.
P. E. Debevec, T. Hawkins, C. Tchou, H.–P. Duiker,W. Sarokin, and M. Sagar. Acquiring the reflectance field of a human face. In *Computer Graphics, Annual Conference Series*, pp. 145–156. Siggraph, Jul. 2000.
R. Epstein, A. Yuille, and P. Belhumeur. Learning object representations from lighting variations. In *ECCV 96 International Workshop*, pp. 179–199, 1996.
G. Healey and T. Binford. Local shape from specularity. *Computer Vision Graphics and Image Processing*, pp. 62–86, Apr. 1988.
A. Lanitis, C. Taylor, and T.Cootes. Modeling the process of aging in face images. In IEEE Proceedings of the 7th International Conference on Computer Vision, pp. 131–136, Sep. 1999.

(List continued on next page.)

Primary Examiner—Phu K. Nguyen
(74) Attorney, Agent, or Firm—Lyon & Harr, LLP; Katrina A. Lyon

(57) ABSTRACT

A system and method for mapping facial expressions. Facial expressions exhibit not only facial feature motions, but also subtle changes in illumination and appearance (e.g., facial creases and wrinkles). These details are important visual cues, but they are difficult to synthesize. Traditional expression mapping techniques consider feature motions while the details in illumination changes are ignored. A novel technique for facial expression mapping is presented. The illumination change of one person's expression is captured in what is called expression ratio image (ERI). Together with geometric warping, an ERI is mapped to any other person's face image to generate more expressive facial expressions.

37 Claims, 13 Drawing Sheets

(6 of 13 Drawing Sheet(s) Filed in Color)

OTHER PUBLICATIONS

P. Litwinowicz and L. Williams. Animating images with drawings. In *Computer Graphics*, pp. 235–242. Siggraph, Aug. 1990.

Z. Liu, Y. Shan, and Z. Zhang. Expressive expression mapping with ratio images. In *Computer Graphics, Annual Conference Series*, pp. 271–276. Siggraph, Aug. 2001.

S. R. Marschner and D. P. Greenberg. Inverse lighting for photography. In *IST/SID Fifth Color Imaging Conference*, Nov. 1997.

S. R. Marschner, B. Guenter, and S. Raghupathy. Modeling and rendering for realistic facial animation. In *Rendering Techniques*, pp. 231–242. Springer Wien NewYork, 2000.

T. Riklin–Raviv and A. Shashua. The quotient image: Class based rerendering and recognition with varying illuminations. In *IEEE Conference on Computer Vision and Pattern Recognition*, pp. 566–571, Jun. 1999.

H. Rushmeier, G. Taubin, and A. Gueziec. Applying shape from lighting variation to bump map capture. In *Eurographics Workshop on Rendering*, pp. 35–44, 1997.

Y. Wu, P. Kalra, and N.M. Thalmann. Physically–based wrinkle simulation & skin rendering. In Eurographics Workshop on Computer Animation and Simulation, pp. 69–79, 1997.

* cited by examiner

SYSTEM AND METHOD FOR EXPRESSION MAPPING

BACKGROUND

1. Technical Field

This invention is directed toward a system and process for facial expression mapping. More particularly, this invention is related to a system and process for mapping an expression on a face in one image to another face in another image.

2. Background Art

Facial expressions exhibit not only facial feature motions, but also subtle changes in illumination and appearance (e.g., facial creases and wrinkles). These details are important visual cues, but they are difficult to synthesize.

One class of methods to generate facial expressions with details is the morph-based approaches and their extensions [2, 14, 16,3]. The main limitation of these approaches is that they can only generate expressions in-between given expressions through interpolation. For example, given a person's neutral, expressionless face, one is not be able to generate this person's facial expressions using morph-based methods.

Another popular class of techniques, known as expression mapping (or performance-driven animation) [4, 10,20, 13], does not have such limitation. It can be used to animate 2D drawings and images, as well as textured or non-textured 3D face models. The concept behind this method is very simple. Given an image of a person's neutral face and another image of the same person's face with an expression, the positions of the face features (eyes, eye brows, mouths, etc.) in both images are located either manually or through some automatic method. The difference vector between the corresponding feature points in both images is calculated and is added to a new face's feature positions to generate the new expression for that face through geometry-controlled image warping [21,2, 10]. One problem with such geometric-warping-based approach is that it only captures the face feature's geometry changes, completely ignoring illumination changes. The resulting expressions do not have the expression details such as wrinkles. These details are actually very important visual cues, and without them, the expressions are less expressive and convincing.

There has been much other work done in the area of facial expression synthesis. For instance, the physically-based approach is an alternative to expression mapping. In one example of this physically-based approach, Badler and Platt [1] used a mass-and-spring model to simulate the skin and muscles. Extensions and improvements to this technique have also been reported [19, 18,9].

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention is directed toward a facial expression mapping system and process that overcomes the aforementioned limitations in prior systems and methods for mapping expressions from one person in an image to another. This system and method for mapping facial expressions uses the illumination change of one person's expression by capturing it in what is called an Expression Ratio Image (ERI). Together with geometric warping, an ERI is mapped to any other person's face image to generate more expressive facial expressions. An ERI can capture subtle but visually important details of facial expressions. The resulting facial expressions are significantly more expressive and convincing that the traditional expression mapping based on geometric warping.

More particularly, the present novel technique captures the illumination change of one person's expression and maps it to any other person to generate more expressive facial expressions. The critical observation is that the illumination change resulting from the change of surface normal can be extracted in a skin-color independent manner by using what is called an expression ratio image (ERI). This ERI can then be applied to an image of any other person to generate correct illumination changes resulted from the geometric deformation of that person's face.

In operation, a first image depicting a first face without expression, a second image depicting the face in the first image with expression whose details are to be transferred, and a third image depicting a face different from the first face and also without expression, are input. The faces in the first, second and third images are aligned, thereby creating a correspondence between pixels in the first, second and third aligned images. For each corresponding pixel in the first and second images, an Expression Ratio Image (ERI) is computed by dividing the intensity of the face with expression in the second aligned image by the face without expression in the first aligned image. A new image of a face with expression is created by multiplying the ERI by each corresponding pixel in the third image.

As stated above, the system and process according to the present invention aligns the faces in the first, second and third images. The process of performing this alignment in one embodiment of the invention requires finding the face features of the faces in the first, second and third images. A difference vector between the feature positions of the faces in the first and second images is then computed. The features of the face in the third image are moved along the difference vector and the face in the third image is warped accordingly. The faces in the first and second images are then aligned with the warped face in the third image through image warping.

Another embodiment of the ERI system and method computes a smoothed version of the Expression Ratio Image. This smoothing is useful in eliminating artifacts that occur due to image warping, especially those that occur in images expressed in red, green, blue (RGB) color space. In this process of computing a smoothed version of the ERI, aligned versions of the faces in the first and second images are input. For each corresponding pixel, the cross correlation of the first and second images is computed. The weight of each corresponding pixel is determined as 1 minus the cross correlation. An adaptive Gaussian filter is then run on the ERI. A threshold is used to determine whether a pixel has a large or small weight. A small window is used with the Gaussian filter for pixels with a large weight. Likewise, a large window is used with the Gaussian filter for pixels with a small weight. It is also possible to discretize the images using numerous thresholds and then applying a series of windows of different sizes with the Gaussian filter. In practice, however, it has been found that using two different window sizes yields good results.

The three images ideally should be taken under the same, or at least similar, lighting conditions. For images taken under completely different lighting conditions, one of several known relighting techniques may be used to compensate for the lighting difference between the images. For instance, histogram matching can be used to compensate for lighting differences between the images. Alternately, the color ratio between the images taken under different lighting conditions can be used to modify at least one of the images such that the lighting between the images is the same. Similarly, the color difference (instead of ratio) between image pairs can be used to modify one of the original images so that it matches the lighting conditions of the other.

One method of compensating for dissimilarities in lighting when the images do not exhibit similar lighting conditions, involves inputting aligned versions of the first image, second image and third image depicted in RGB color space. Component images are then calculated for each of the first, second and third images in YUV color space. For each corresponding pixel in the first and second images, a color correction ratio is calculating by dividing the y component of the first image by the y component of the second image. For each corresponding pixel in the third image a revised y component in YUV color space is calculated as the color correction ratio multiplied by the previously calculated y component of the third image. The component image of the third image in YUV color space is then converted to RGB color space using a standard conversion.

The mapping of expressions using ERIs can be extended to facial expression mapping for 3D textured face models. A 3D textured face model consists of a 3D geometric shape and a 2D texture image. In this case, ERIs are applied to the texture image. By both deforming the geometric shape and modifying the texture image accordingly, more expressive facial expressions are thus obtained for 3D facial animation. This technique also applies to shaded 3D face models. One can map expressions between synthetic face models, as well as map between real face expressions and synthetic face models.

The file of this patent contains at least one drawing executed in color. Copies of this patent with color drawing(s) will be provided by the U.S. Patent and Trademark Office upon request and payment of the necessary fee.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
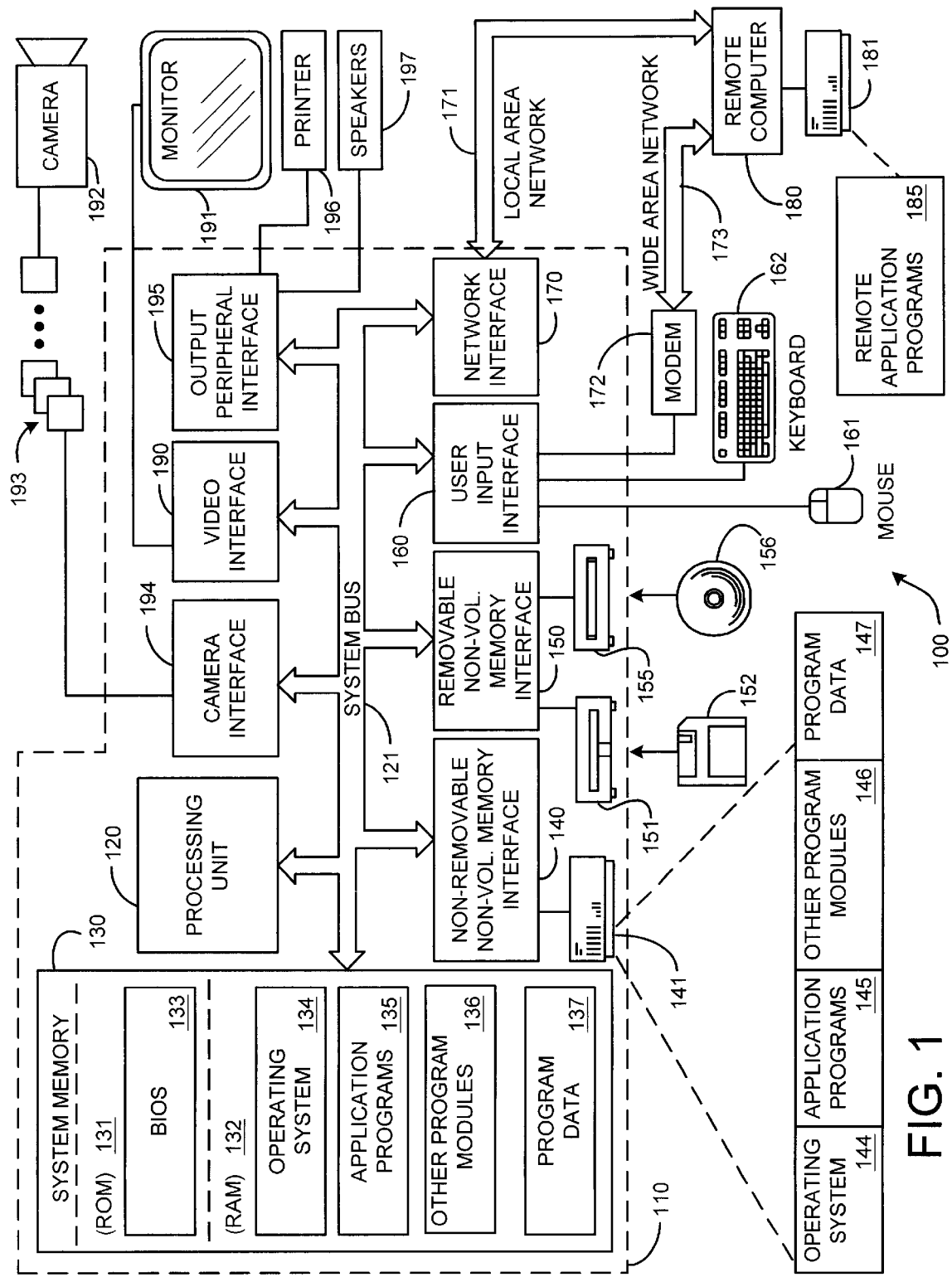
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Expression Ratio Image System and Method 2.1 Overview

Figure 2:
FIG. 2 is a series of images showing expression mapping according to the present invention. The left images shows a neutral face. The middle image depicts the result after geometric warping. The right image shows result of expression mapping from the system and method according to the present invention.

In this section, the system and method of Expression Mapping with Ratio Images is described. The description includes Expression Ratio Image theory, implementation and exemplary results. The resulting facial expressions are significantly more expressive and convincing than the traditional expression mapping based on geometric warping. As an example, FIG. 2 shows a comparison of an expression with and without the expression details. The left image is the original neutral face. The one in the middle is the expression generated using a traditional expression mapping method. The image on the right is the expression generated using the system and method according to the present invention. The feature locations on the right image are exactly the same as those on the middle image, but because there are expression details, the right image looks much more convincing than the middle one. The present novel technique captures the illumination change of one person's expression and maps it to any other person to generate more expressive facial expressions.

2.2 Expression Ratio Image Theory

For any point p on a surface Π, let n denote its normal. Assume there are m point light sources. Let $l_i$, $1 \leq i \leq m$, denote the light direction from p to the i th light source, and $I_i$ its intensity. Suppose the surface is diffuse, and let p be its reflectance coefficient at p. Under the Lambertian model, the intensity at p is $$I = \rho \sum_{i=1}^{m} I_i n \cdot l_i \qquad (1)$$

After the surface is deformed, the intensity at p becomes $$I' = \rho \sum_{i=1}^{m} I_i n' \cdot l'_i \qquad (2)$$

where n' is the normal at p after deformation, and $l'_i$ is the light direction after deformation.

From Equations (1) and (2), $$\frac{I'}{I} = \frac{\sum_{i=1}^{m} I_i n' \cdot l'_i}{\sum_{i=1}^{m} I_i n \cdot l_i} \qquad (3)$$

It is denoted $$\mathcal{R} = \frac{\sum_{i=1}^{m} I_i n' \cdot l'_i}{\sum_{i=1}^{m} I_i n \cdot l_i} \qquad (4)$$

$\mathcal{R}$ which is a real function defined over surface Π, is called the expression ratio image (ERI) of Π. From (3), the result is $$I' = \mathcal{R} I \qquad (5)$$

for each point on the surface Π.

The ERI, $\mathcal{R}$, is independent of the reflectance coefficients. Equation (5) holds for any reflectance function of the surface Π. So for any unknown reflectance function, if the illumination is known before deformation, then its illumination can be obtained after deformation by simply multiplying the expression ratio image $\mathcal{R}$ with the illumination before deformation.

Consideration is now given as to how to map one person's expression to another. Given two people's faces A and B, assume for every point on A, there is a corresponding point on B that has the same meaning (eye corners, mouth corners, nose tip, etc). By applying Equation (3) to A and B at each point, $$\frac{I'_a}{I_a} = \frac{\sum_{i=1}^{m} I'_i n'_a \cdot l'_{ia}}{\sum_{i=1}^{m} I_i n_a \cdot l_{ia}} \qquad (6)$$

$$\frac{I'_b}{I_b} = \frac{\sum_{i=1}^{m} I'_i n'_b \cdot l'_{ib}}{\sum_{i=1}^{m} I_i n_b \cdot l_{ib}} \qquad (7)$$

Since human faces have approximately the same geometrical shape, if they are in the same pose, their surface normals at the corresponding positions are roughly the same, that is, $n_a \approx n_b$, $n'_a \approx n'_b$, and the lighting direction vectors are also roughly the same, that is, $I_{ia} \approx I_{ib}$, $I'_{ia} \approx I'_{ib}$. Under this assumption, $$\frac{I'_a}{I_a} = \frac{I'_b}{I_b} \qquad (8)$$

Of course, if A and B have exactly the same shape, the above equation is exact, not approximate. The approximation error increases with the shape difference between two faces and with the pose difference when the images are taken.

Let $\mathcal{A}$ and $\mathcal{A}$ denote the images of A's neutral face and expression face, respectively. Let $\mathcal{B}$ denote the image of person B's neutral face, and $\mathcal{B}$ the unknown image of his/her face with the same expression as $\mathcal{A}$. Furthermore, assuming these images have been aligned, then by (8), the result is $$\frac{\mathcal{B}'(u, v)}{\mathcal{B}(u, v)} = \frac{\mathcal{A}'(u, v)}{\mathcal{A}(u, v)} \qquad (9)$$

where (u v) are the coordinates of a pixel in the images. Therefore, $$\mathcal{B}'(u, v) = \mathcal{B}(u, v) \frac{\mathcal{A}'(u, v)}{\mathcal{A}(u, v)} \qquad (10)$$

More realistically, the images are usually taken in different poses with possibly different cameras, and so are usually not aligned. In order to apply the above equations, the images should be aligned first.

2.3 Implementation of Expression Ratio Image

Figure 3A:
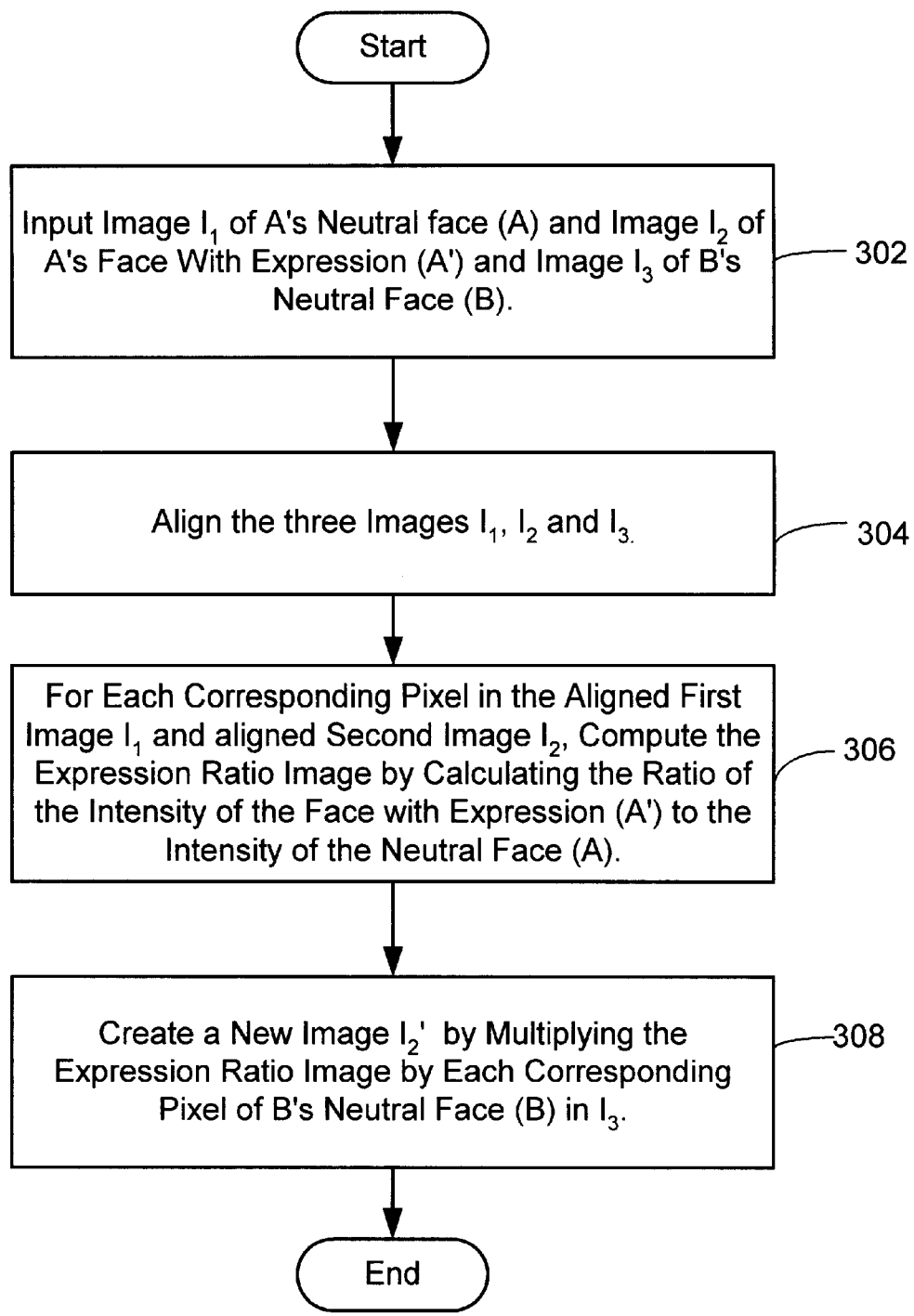
FIG. 3A is a flow diagram depicting the general process actions of the system and method according to the present invention.
Figure 3B:
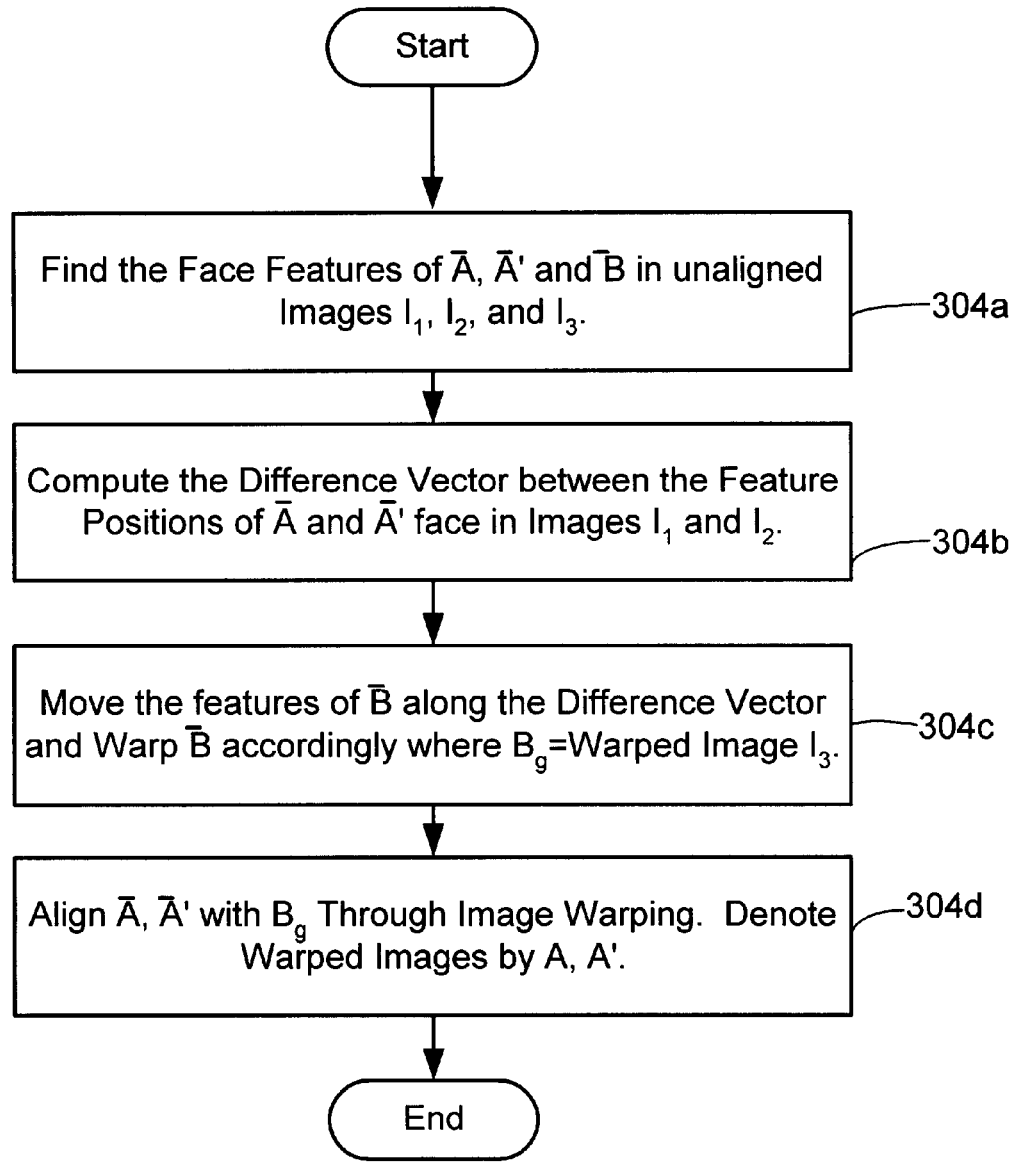
FIG. 3B is a flow diagram depicting one method of aligning the images as depicted in FIG. 3A.

In most general terms, FIGS. 3A and 3B depict the overall process of the ERI technique of expression mapping. An image with a neutral face of A, an image with a face with expression of A and a third image with a neutral face of B, are input, as shown in process action 302. The three images are then aligned (process action 304). For each corresponding pixel in the first aligned image and the second aligned image, the ERI is computed (process action 306). A new image is then created by multiplying the ERI by each corresponding pixel in the third image.

More specifically, given images, $\mathcal{A}$ (neutral face), $\mathcal{A}$ (face with expression) and $\mathcal{B}$ (neutral face) which have not been aligned, the following procedure for facial expression mapping which captures illumination changes.

1. Find Face Features. Find the face features of $\mathcal{R}$, $\mathcal{A}$ and $\mathcal{A}$, either manually or by some automatic method (process action 304a).

2. Compute the Difference Vector Between Feature Positions. Compute the difference vector between the feature positions of $\mathcal{B}$, $\mathcal{A}$ (process action 304b). Move the features of $\mathcal{A}$ along the difference vector, and warp the image accordingly (process action 304c). Let $\mathcal{B}$ be the warped image. This is the traditional expression mapping based on geometric warping.

3. Image Alignment. Align $\mathcal{A}$, $\mathcal{A}$ and $\mathcal{B}$ through image warping (process action 304d) and denote the warped images $\mathcal{A}$ and $\mathcal{A}$.

4. Compute the Expression Ratio Image. As shown in FIG. 3A, process action 306, compute the Expression Ratio Image $$\mathcal{R}(u, v) = \frac{A'(u, v)}{A(u, v)}$$

5. Output. Compute the new image, as shown in process action 308), by setting $\mathcal{B} = \mathcal{R}\mathcal{B}$.

This procedure requires three warping operations for each input image $\mathcal{B}$. When applying the same expression to many people, some computation efforts can be saved by pre-computing the expression ratio image with respect to $\mathcal{A}$ or $\mathcal{A}$. During expression mapping for a given image $\mathcal{B}$, that expression ratio image is first warped to $\mathcal{B}$ and then the warped ratio image is multiplied with $\mathcal{B}$. In this way, warping is only performed twice, instead of three times, for every input image.

2.3.1 Colored Lights

Figure 4A:
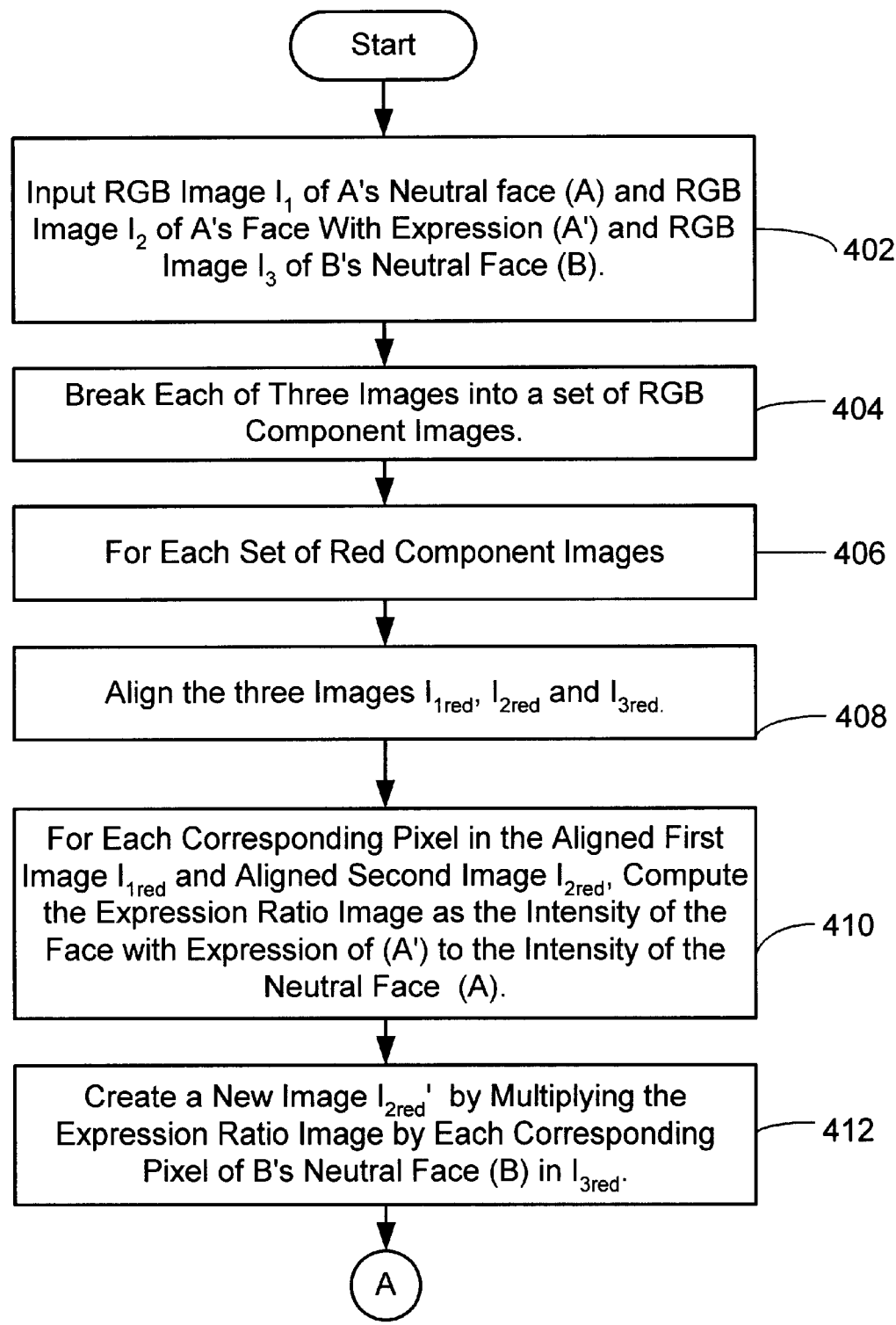
FIGS. 4A and 4B show a flow diagram depicting the system and process according to the present invention as applied to RGB images.
Figure 4B:
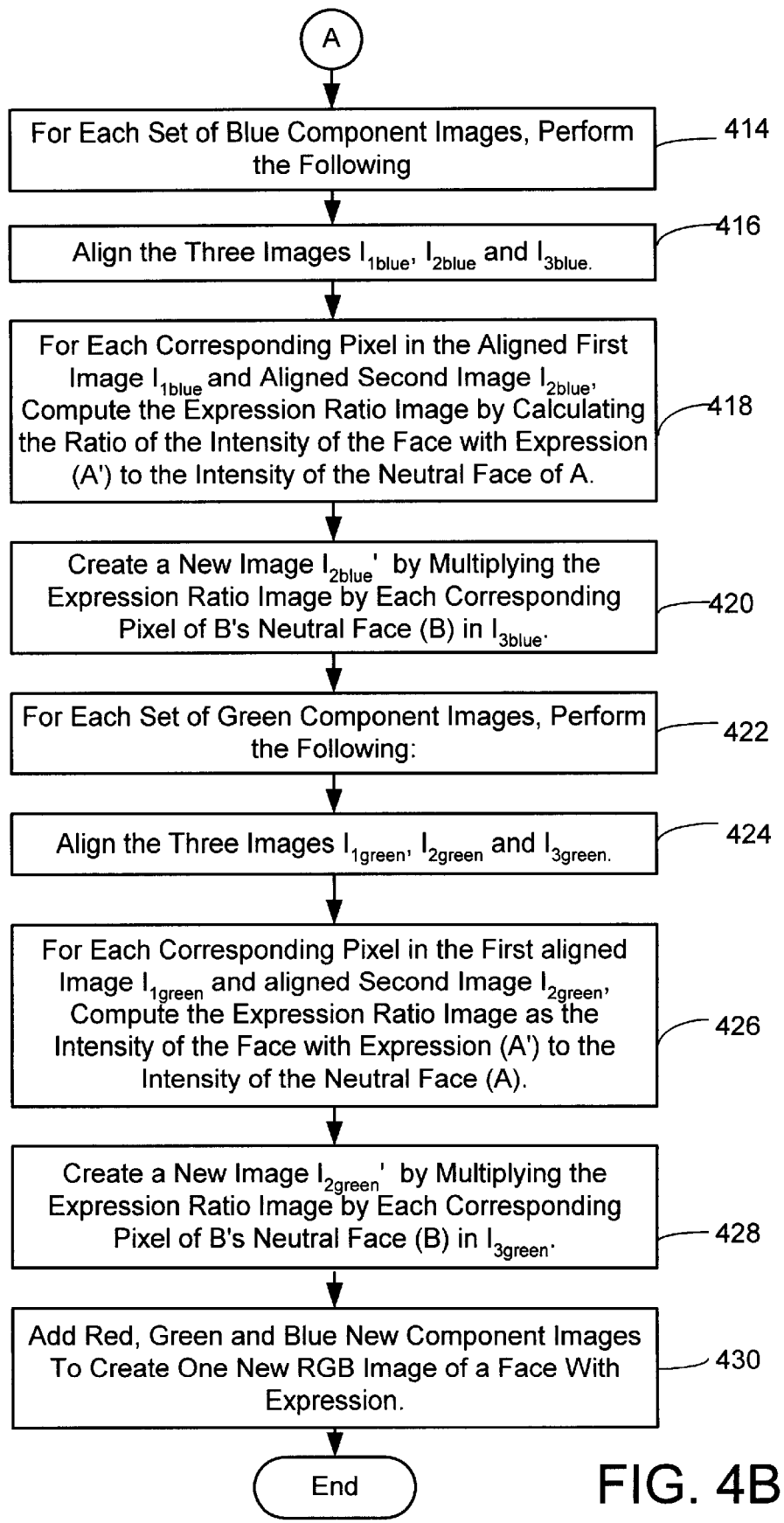

In the above discussion, only monochromatic lights were considered. For colored lights, exactly the same equations are applied to each R, G and B component of the color images, and an ERI for each component is computed. During expression mapping, each ERI is independently applied to the corresponding color component of the input image. This procedure is shown in FIGS. 4A and 4B. In the manner discussed above, three images are input into the system, but these images are defined in RGB color space (process action 402). As shown in process action 404, each of the three images are broken down into a set of red, green and blue component images. Then, in a similar manner as discussed above, the three red component images are aligned (process action 408), the ERI is calculated (process action 410), and a new red image is computed by multiplying the ERI by the third red component image. This process is repeated for the set of blue component images (process actions 414 to 420), and the set of green component images (process actions 422 to 428). Once all the new red, blue and green component images are calculated, they are added together to create one RGB image of a face with a new expression (process action 430).

If all the light sources have the same color but only differ in magnitude, it is not difficult to find that the three ERIs are equal to each other. To save computation time and processing, only one ERI needs to be computed in this case.

2.3.2 Comments on Different Lighting Conditions

If the lighting conditions for $\mathcal{A}$ and $\mathcal{B}$ are different, Equation (10) does not necessarily hold. If, however, there is only an intensity scaling while the light directions are the same, the equation is still correct. This probably explains why the method works reasonably well for some of the images taken under different lighting environments.

In other cases, it was found that performing color histogram matching [8] before expression mapping is helpful in reducing some of the artifacts due to different lighting conditions. In addition, it was found that the result is noisy if the three color ERIs are directly applied in RGB color space. Therefore, it was found to be useful to convert RGB images to a different color space for ERI calculations. For instance, YUV and YIQ color spaces are based on luminance and chrominance, which correspond to brightness and color. It was found that using YUV and YIQ color space to reduce artifacts due to varying lighting conditions leads to improved results. These two methods of defining color space are nearly identical, using slightly different conversion equations to transform to At and from RGB color space. In both systems, Y is the luminance or brightness component and the I and Q (or U and V) are the chrominance, or color, components. It was found that in correcting images for different lighting conditions, it was better to first convert RGB images into the YUV space [7], compute the ratio image only for the Y component, map it to the Y component of the input image, and finally convert the resulting image back into the RGB space.

Figure 5:
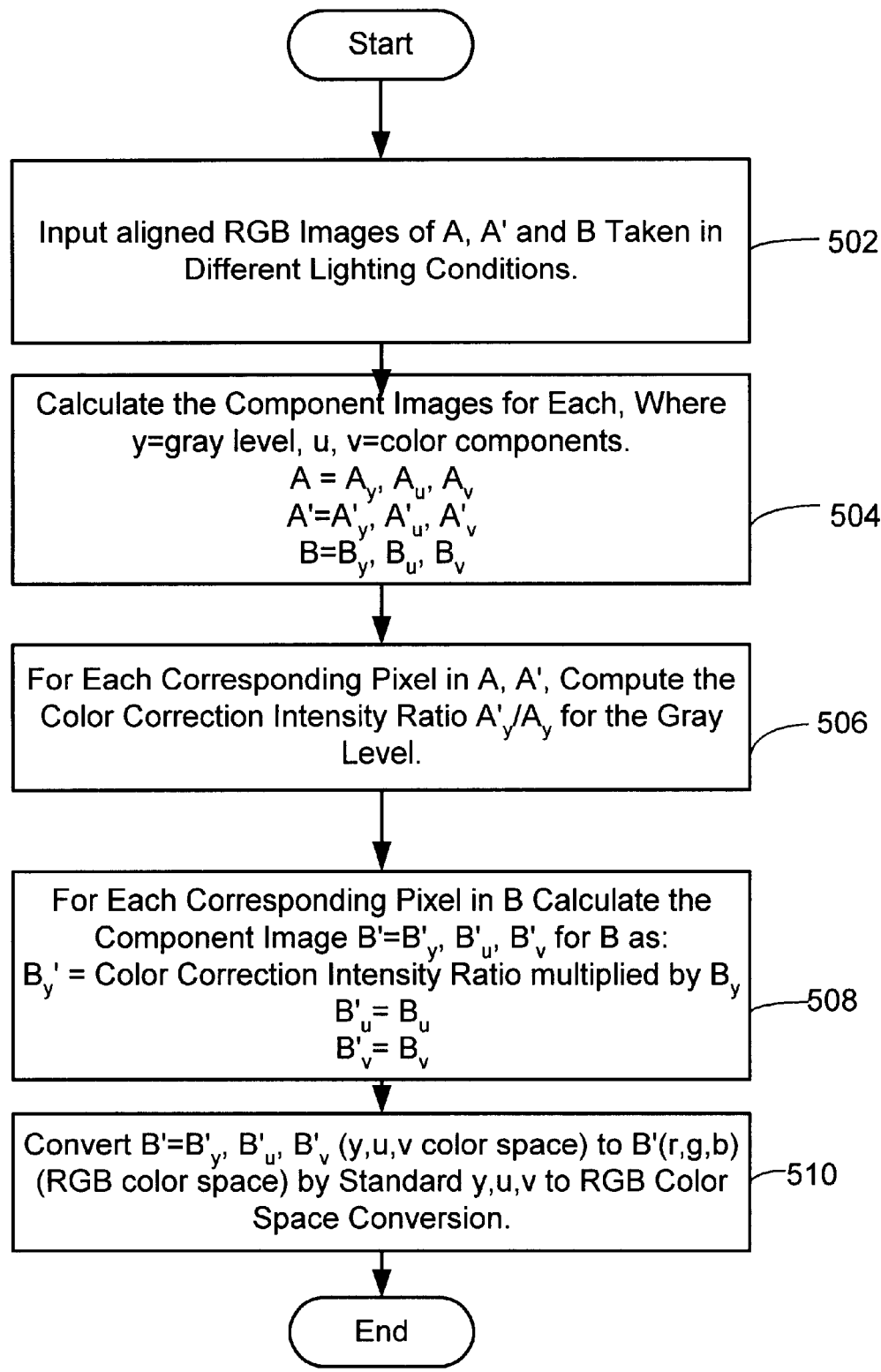
FIG. 5 is a flow diagram depicting the correction of RGB images taken in dissimilar lighting conditions.

FIG. 5 depicts the process actions of such a color correction procedure. As shown in process action 502, RGB images A, A' and B taken under different lighting conditions are input into the system. The component images of each image are computed using known conversion equations (process action 504), resulting in $A = A_y, A_u, A_v$ $A' = A'_y, A'_u$ and $A'_v$ $B = B_y, B_u$ and $B_v$.

For each corresponding pixel in A, A' the color correction ratio is calculated by dividing $A'_y$ by $A_y$, as shown in process action 506. The component image $B' = B'_y$, $B'_u$ and $B'_v$ is also calculated for each corresponding pixel in B, as shown in process action 508, where the components are $B'_y$ = color correction ratio $\times B_y$ $B'_u = B_u$ $B'_v = B_v$ The component image $B' = B'_y$, $B'_u$ and $B'_v$ is then converted from YUV color space back to RGB color space using a standard YUV to RGB conversion, as shown in process action 510. A similar procedure can be used to correct images taken under different lighting conditions by using CYM or HSI color space or any other color space representation.

Other sophisticated relighting techniques could also be used. For instance, Marschner et al. [11] used the color ratio between the rendered image pairs under the old and new lighting conditions to modify images taken under an old lighting condition to generate photographs under a new lighting condition. In a similar spirit, Debevec [5] used the color difference (instead of ratio) between synthesized image pairs. Given an image of a face under two different lighting conditions and another face under a lighting condition like that of the first, Riklin-Raviv and Shashua [15] used color ratio (called quotient image) to generate an image of the second face under the second lighting condition. Stoschek [17] combined this technique with image morphing to generate the re-rendering of a face under continuous changes of poses or lighting directions.

2.4 Filtering

Since image alignment is based on image warping controlled by a coarse set of feature points, misalignment between the neutral faced image $\mathcal{A}$ and expressionful faced image $\mathcal{A}$ is unavoidable, resulting in a noisy expression ratio image. It is therefore necessary to filter the ERI somehow to remove the noise caused by pixel misalignment while not smoothing out the wrinkles. In one embodiment of the present invention, an adaptive smoothing filter is used with little smoothing in expressional areas and strong smoothing in the remaining areas.

Figure 6:
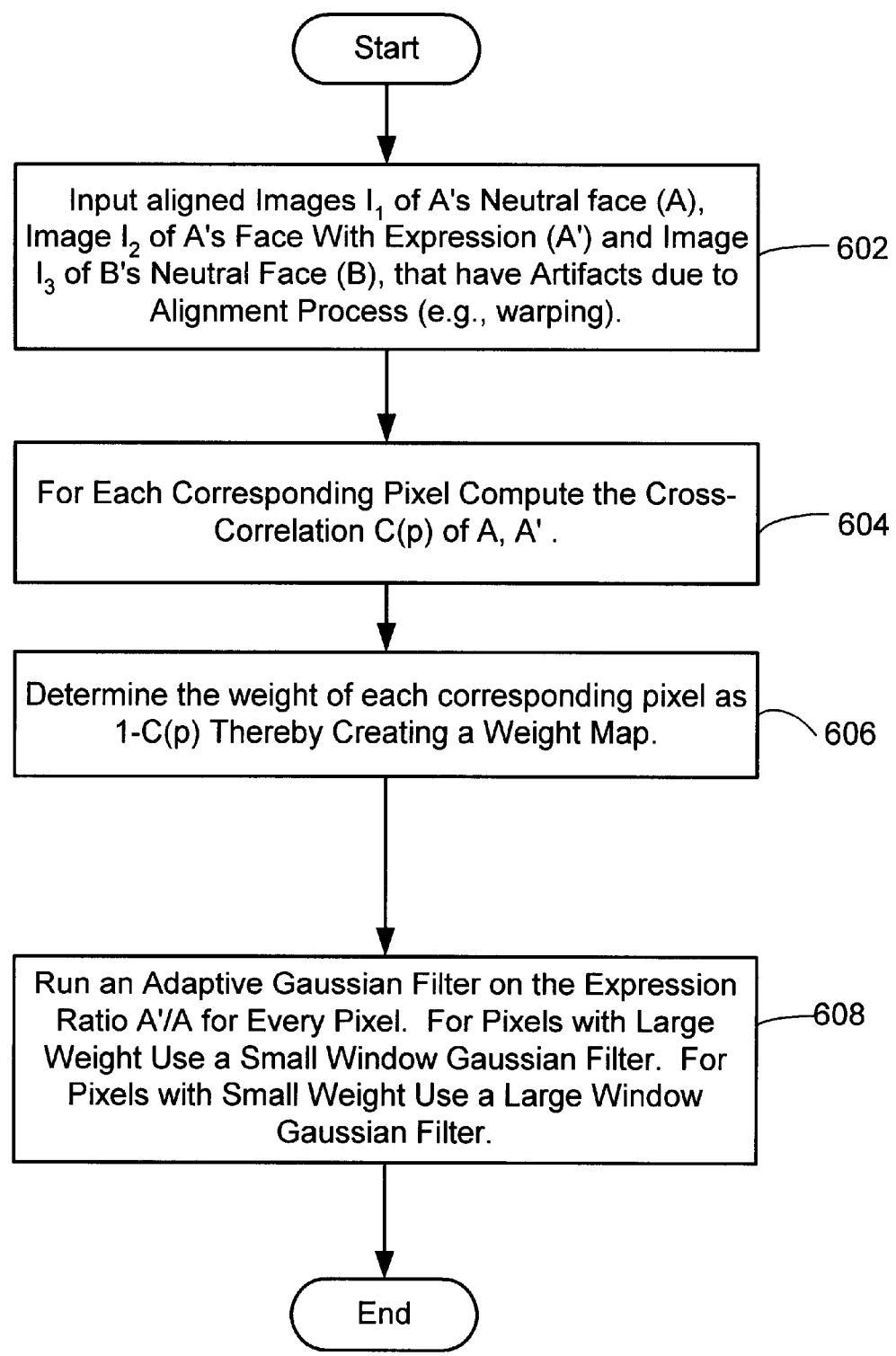
FIG. 6 is a flow diagram depicting a filtering process used to correct for artifacts that result from the alignment of RGB images.

Since $\mathcal{A}$ and $\mathcal{A}$ have been roughly aligned, their intensities in the non-expressional areas should be very close, i.e., the correlation is high, while their intensities in the expressional areas are very different. The images are input into the system, as shown in process action 602 of FIG. 6. For each pixel a normalized cross correlation c between $\mathcal{A}$ and $\mathcal{A}$ is computed (process action 604). Each pixel is assigned 1-c as its weight, as shown in process action 606. After the weight map is computed, an adaptive Gaussian filter is run on the ERI (process action 608). For pixels with a large weight, a small window Gaussian filter is used so that expressional details are not filtered out. For pixels with a small weight, a large window is used to smooth out the noise in the ERI. It is possible to descretize the weights into many levels and assign a different window size for each level. But in practice it has been shown that it is enough to use just two levels.

2.5 Extension to 3D Textured Face Models

The mapping of expressions using ERIs can be extended to facial expression mapping for 3D textured face models. A 3D textured face model consists of a 3D geometric shape and a 2D texture image. In this case, ERIs are applied to the texture image. By both deforming the geometric shape and modifying the texture image accordingly, more expressive facial expressions are thus obtained for 3D facial animation.

More specifically, a 3D geometric model of person A under neutral expression, $S_A$, and its associated texture image, $I_A$, a second 3D geometric model of the same person A but with expression, $S'_A$, and its associated texture image, $I'_A$, and a 3D geometric model of person B under neutral expression, $S_B$, and its associated texture image, $I_B$, are input. The 3D geometric models are expressed in a common coordinate system. The following procedure allows mapping A's facial expression to B to generate a 3D textured face model of B with expression.

1. Find face features. Find the face feature points in $S_A$, $S'_A$, and $S_B$, either manually or by some automatic method.
2. Compute the Difference Vector Between Feature Positions. Compute the difference vector between the feature positions of $S_A$ and $S'_A$. Move the features of $S_B$ along the difference vector, and warp the texture image $I_B$ accordingly. Let $S_{Bg}$ be the deformed geometric model and $I_{Bg}$ be the warped texture image. This is the traditional expression mapping based on geometric warping.
3. Image alignment. Align $S_A$ and $S'_A$ with $S_{Bg}$ by moving along their respective difference vectors, and warp the texture images $I_A$ and $I'_A$ accordingly. Denote the warped images $I_{Ag}$ and $I'_{Ag}$.
4. Compute the Expression Ratio Image. Compute the Expression Ratio Image pixel by pixel as $$\mathcal{R}(u, v) = \frac{I'_{Ag}(u, v)}{I_{Ag}(u, v)}$$

5. Output. Compute the new texture image by setting $I'_B = \mathcal{R} I_{Bg}$.

This technique also applies to shaded 3D face models. One can map expressions between synthetic face models, as well as map between real face expressions and synthetic face models.

3.0 Results

Figure 7:
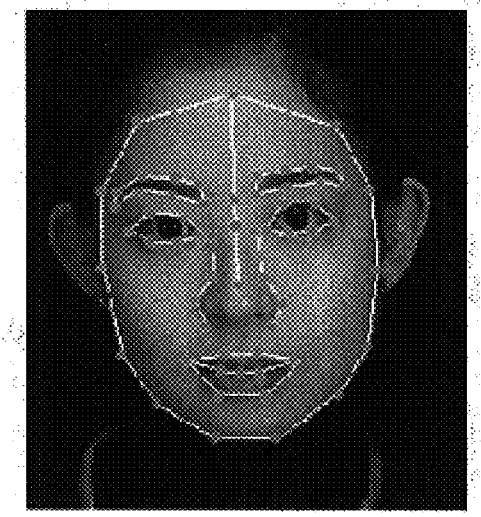
FIG. 7 is an image showing an example of the mark points used for image warping.

In this section, some results of using the ERI method are shown. For each image, mark points are manually put on the face features. FIG. 7 shows an example of the mark points. Currently only the points depicted in this image are used as features for image warping while the line segments in the figure are only for display purpose. Conventional texture mapping hardware and software is used to warp an image from one set of markers to another by simply applying Delauney triangulation to the mark points. This method is fast, but the resulting image quality is not as good as with other more advanced image warping techniques [2,10] can also be used.

Figure 8:
FIG. 8 is a series of images of an expression used to map to other people's faces. The image on the right is its expression ratio image. The ratios of the RGB components are converted to colors for display purpose.
Figure 9:
FIG. 9 is a series of images illustrating the mapping a thinking expression. Left: neutral face. Middle: result from geometric warping. Right: result from ERI.

For the first example, the thinking expression of the middle image in FIG. 8 is mapped to a different person's neutral face that is the left image of FIG. 9. The middle image of FIG. 9 is the result from the traditional geometrical warping. The right image is the result of the ERI method. It can be seen that the wrinkles due to the skin deformation between the eyebrows are nicely captured by the ERI method. As a result, the generated expression is more expressive and convincing than the middle one obtained with geometric warping.

Figure 10:
FIG. 10 is a series of images illustrating the expressions used to map to other people's faces.

FIG. 2 shows an example of mapping the expression displayed in FIG. 10(a). The left image is her neutral face. The result (the right image of FIG. 2) contains the visual effects of skin deformations around the nose and mouth region. It is clearly a more convincing smile than the middle image that is generated by geometric warping.

Figure 11:
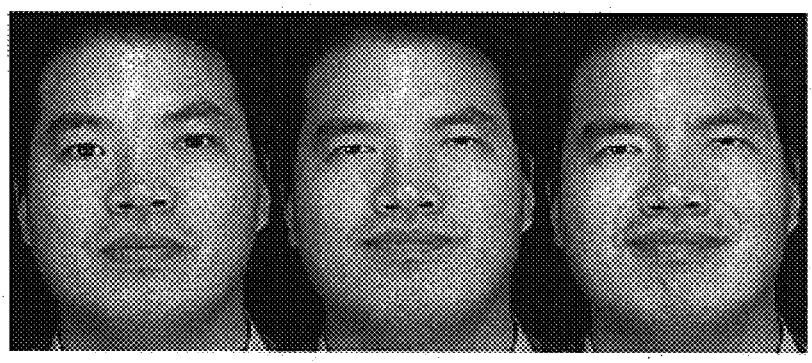
FIG. 11 is a series of images showing the mapping of a sad expression. Left: neutral face. Middle: result from geometric warping. Right: result from ERI.
Figure 12:
FIG. 12 is a series of images showing the mapping of a eyebrow raising expression. Left: neutral face. Middle: result from geometric warping. Right: result from ERI.
Figure 13:
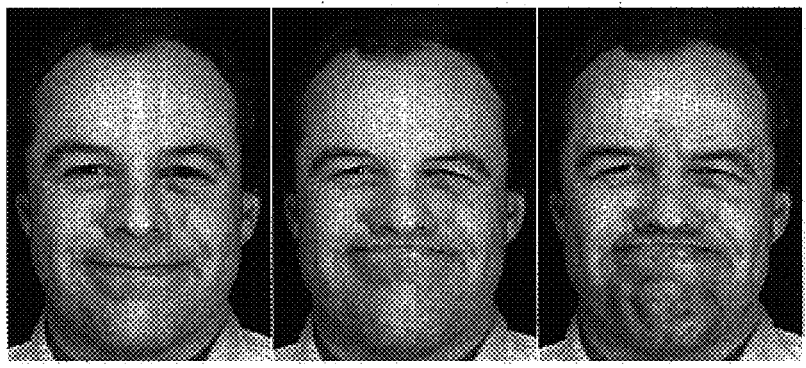
FIG. 13 is a series of images showing the mapping of a frown expression to a smile expression. Because the two expressions are in separate face regions, the mapping is almost equivalent to the sum of the two expressions. Left: the existing expression. Middle: result from geometric warping. Right: result from ERI.
Figure 14:
FIG. 14 is a series of images showing expression mappings with different lighting conditions. Left: neutral face. Middle: result from geometric warping. Right: result of ERI.
Figure 15:
FIG. 15 is a series of images showing the mapping of a smile. Left: neutral face. Middle: result from geometric warping. Right: result from ERI.
Figure 16:
FIG. 16 is a series of images showing the mapping of a smile to the Mona Lisa's face. Left: neutral face. Middle: result from geometric warping. Right: result from ERI.
Figure 17:
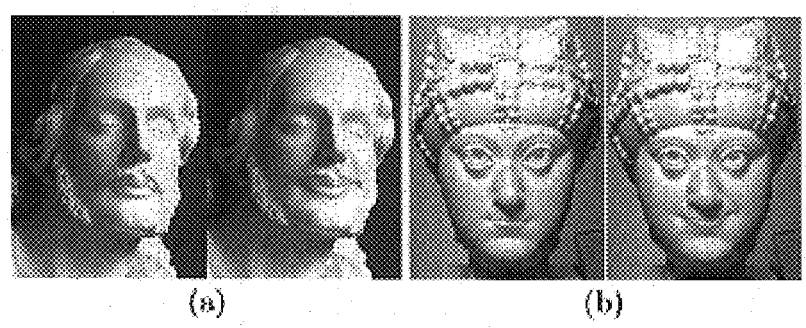
FIG. 17 is a series of images showing the mapping of expressions to statues. (a) Left: original statue. Right: result from ERI. (b) Left: another original statue. Right: Result from ERI.

FIG. 11 shows the result of mapping the sad expression in FIG. 10(c). The right image in FIG. 11 is the result generated by using the ERI method, while the result from geometric warping is shown in the middle. The right image clearly shows a sad/bitter expression, but there is hardly any sadness seen from the middle image. FIG. 12 shows the result of mapping a eyebrow-raising expression in FIG. 10(d). It can be seen that the wrinkles on the forehead are mapped nicely to the female's face. FIG. 13 shows the result of mapping the frown expression in FIG. 10(e) to an already smiling face (the left image in FIG. 13). Because the frown expression is in a separate face region from the existing smile expression, the mapping works quite well and the resulting expression is basically the sum of the two different expressions. FIG. 14 shows an example of mapping expressions under different lighting conditions. The thinking expression in FIG. 10(f) is mapped to the neutral face in FIG. 14. These two images were taken in different lighting environment. Again, the image on the right is the result using the ERI system and method. It can be seen that the wrinkles between and above the two eyebrows are mapped quite well to the target face. The resulting expression clearly exhibits the visual effects of eyebrow crunching. In FIGS. 15, 16 and 17, the results of mapping the smile expression in FIG. 10(b) to different faces are shown. FIG. 15 shows this smile expression being mapped to a male's face. The left image is the neutral face. The middle image is generated using geometric warping and it can be seen that the mouth-stretching does not look natural. The image on the right is generated using the ERI method. The illumination changes on his two cheek bones and the wrinkles around his mouth create the visual effects of skin-bulging. It exhibits a more natural and convincing smile.

FIG. 16 shows the result of mapping the same smile expression in FIG. 10(b) to Mona Lisa. The left image in FIG. 16 is the image generated by Seize and Dyer [16] using their view morphing technique. The image on the right is the result generated using the ERI system and method. The wrinkles around her two mouth corners make her smile look more natural and convincing than the one in the middle which is generated using geometric warping.

FIG. 17 shows the results of mapping the smile expression of FIG. 10(b) to two statues. The images of both statutes are downloaded from the web. The wrinkle around her left mouth corner and illumination changes on the left cheek are mapped nicely to both statues. The more subtle wrinkle around her right corner is mapped to (b) as well. However, it does not get mapped to (a) because of the shadow on this statue's right face.

Figure 18:
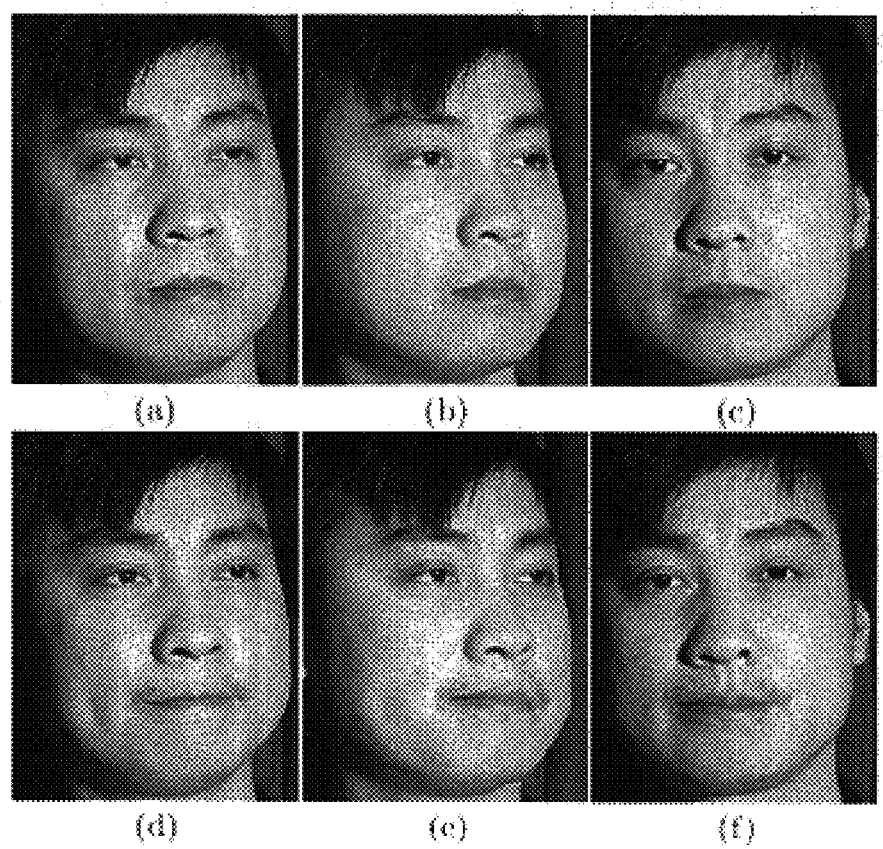
FIG. 18 is a series of images showing how expression mapping may fail when the face poses are too far apart.

When the poses of the two faces are different, the mapping may fail. FIG. 18 shows such an example. FIGS. 18(a), 18(b) and 18(c) are the same neutral faces with different poses. FIGS. 18(e) and 18(f) are the results of mapping expression of FIG. 18(d), 18(b) and 18(c), respectively. Notice that the original expression in FIG. 18(d) has a dimple on his right face. Because the pose of FIG. 18(b) is different from that in FIG. 18(a), the dimple in FIG. 18(e) is not as clear as in the original expression. The difference between the poses shown in FIG. 18(c) and FIG. 18(a) is even larger and the dimple does not get mapped at all.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

References

[1] T. Beier and S. Neely. Feature-based image metamorphosis. In *Computer Graphics*, pages 35–42. Siggraph, July 1992.

[2] Boissieux, G. Kiss, N. m. Thalman and P. Karla. Simulation of Skin Aging and Wrinkles with Cosmetic Insights. In *Computer Animation and Simulation 2000*, 2000.

[3] J. Blinn, Models of light reflection for computer synthesized pictures. In Computer Graphics, pages 192–198, SIG-GRAPH, July 1977.

[4] N. Burson and T. D. Schneider. Method and apparatus for producing an image of a person's face at a different age. U.S. Pat. No. 4,276,570, 1981.

[5] C. Choi, Age Change for Predicting Future Faces. In *IEEE International Fuzzy Systems Conference Proceedings*, pages 1603–1608, 1999.

[6] P. E. Debevec. Rendering synthetic objects into real scenes: Bridging traditional and image-based graphics with global illumination and high dynamic range photography. In *Computer Graphics, Annual Conference Series*, pages 189–198.

[7] P. E. Debevec, T. Hawkins, C. Tchou, H. -P. Duiker, W. Sarokin, and M. Sagar. Acquiring the reflectance field of a human face. In *Computer Graphics, Annual Conference Series*, pages 145–156. Siggraph, July 2000.

[8] R. Epstein, A. Yuille, and P. Belhumeur. Learning object representations from lighting variations. In *ECCV96 International Workshop*, pages 179–199, 1996.

[9] G. Healey and T. Binford. Local shape from specularity. *Computer Vision Graphics and Image Processing*, pages 62–86, April 1988.

[10] B. Horn and M. J. Brooks. *Shape from Shading*. MIT Press, 1989.

[11] A. Lanitis, C. Taylor, and T.Cootes. Modeling the process of aging in face images. In IEEE Proceedings of the 7th International Conference on Computer Vision, pages 131–136.

[12] P. Litwinowicz and L. Williams. Animating images with drawings. In *Computer Graphics*, pages 235–242. Siggraph, August 1990.

[13] Z. Liu, Y. Shan, and Z. Zhang. Expressive expression mapping with ratio images. In *Computer Graphics, Annual Conference Series*, pages 271–276. Siggraph, August 2001.

[14] S. R. Marschner and D. P. Greenberg. Inverse lighting for photography. In *IST/SID Fifth Color Imaging Conference*, November 1997.

[15] S. R. Marschner, B. Guenter, and S. Raghupathy. Modeling and rendering for realistic facial animation. In *Rendering Techniques*, pages 231–242. Springer Wien N.Y., 2000.

[16] T. Riklin-Raviv and A. Shashua. The quotient image: Class based rerendering and recongnition with varying illuminations. In *IEEE Conference on Computer Vision and Pattern Recognition*, pages 566–571, June 1999.

[17] H. Rushmeier, G. Taubin, and A. Gueziec. Applying shape from lighting variation to bump map capture. In *Eurographics Workshop on Rendering*, pages 35–44, 1997.

[18] Y. Wu, P. Kalra, and N. M. Thalmann. Physically-based wrinkle simulation & skin rendering. In Erographics Workshop on Computer Animation and Simulation, pages 69–79, 1997.

Wherefore, what is claimed is:

1. A computer-implemented process for transferring an expression from a face in a first image to a second face in a second image, comprising using a computer to perform the following process actions:
   inputting a first image depicting a face without expression, a second image depicting the same face as in the first image with an expression whose details are to be transferred, and a third image depicting a face of different from the first face without expression;
   aligning the faces in the first, second and third images, thereby creating a correspondence between pixels in the first, second and third aligned images;
   for each corresponding pixel in the first and second image, computing an expression ratio image by dividing the intensity of the face with expression in the second aligned image by the intensity of the face without expression in the first aligned image; and
   creating a new image of a face with expression by multiplying the expression ratio image by each corresponding pixel in the third image.

2. The computer-implemented process of claim 1 wherein the same expression ratio image is used to create more than one new image of a face by multiplying the expression ratio image by each corresponding pixel in more than one image.

3. The computer implemented process of claim 1 wherein the process action of aligning the faces in the first, second and third images comprises the process actions of:
   finding the face features of the faces in the first, second and third images;
   computing the difference vector between the feature positions of the faces in the first and second images;
   moving the features of the face in the third image along the difference vector and warping the face in said third image accordingly; and
   aligning the faces in the first and second images with the warped face in the third image through image warping.

4. The process of claim 3 wherein the features of the face comprise at least one of: eye corners, mouth corners, eyebrows and nose tip.

5. The process of claim 1 further comprising the process action of computing a smoothed version of the expression ratio image.

6. The process of claim 5 wherein the process action of computing a smoothed version of the expression ratio image comprises:
   inputting aligned versions of the faces in the first and second images;
   for each corresponding pixel, computing the cross correlation of the first and second images;
   determining the weight of each corresponding pixel as 1 minus the cross correlation; and
   running an adaptive Gaussian filter for the expression ratio image.

7. The process of claim 6 wherein a threshold is used to determine whether a pixel has a large or small weight.

8. The process of claim 7 wherein a small window is used with the Gaussian filter for pixels with a large weight.

9. The process of claim 7 wherein a large window is used with the Gaussian filter for pixels with a small weight.

10. The process of claim 6 wherein more than one threshold is used to categorize the weight of a pixel.

11. The process of claim 10 wherein a scale of windows of increasing size from small to large is used with the Gaussian filter, said smaller windows being used for pixels with larger weight.

12. The process of claim 1 wherein the first, second and third images do not exhibit similar lighting conditions and wherein a relighting technique is applied to compensate for the differences in the lighting conditions between the first, second and third images.

13. The process of claim 12 wherein histogram matching is used to compensate for the differences in the lighting conditions between the first, second and third images.

14. The process of claim 12 wherein the relighting technique comprises the process actions of:
   inputting aligned images of the first image, second image and third image depicted in RGB color space and taken under different lighting conditions;
   calculating the component images for each of the first, second and third images in YUV color space;
   for each corresponding pixel in the first and second images, computing a color correction ratio of the y component of the second image to the y component of the first image;
   for each corresponding pixel in the third image calculating a revised y component in YUV color space as the color correction ratio multiplied by the previously calculated y component of the third image; and
   converting the component image of the third image in YUV color space to RGB color space using a standard conversion.

15. The process of claim 13 wherein the relighting technique comprises the process actions of:
   inputting aligned images of the first image, second image and third image depicted in RGB color space and taken under different lighting conditions;
   calculating the component images for each of the first, second and third images in a color space defined by a luminance and a first and second chrominance component;
   for each corresponding pixel in the first and second images, computing a color correction ratio of the luminance component of the second image to the luminance component of the first image;
   for each corresponding pixel in the third image calculating a revised luminance component in said color space defined by a luminance and a first and second chrominance component as the color correction ratio multiplied by the previously calculated luminance component of the third image; and converting the component image of the third image in said color space defined by said luminance component and said first and second chrominance component to RGB color space using a standard conversion.

16. The process of claim 1 wherein the input images are monochrome.

17. A system for transferring the expression from a face to another face, the system comprising:
- a general purpose computing device; and
- a computer program comprising program modules executable by the computing device, wherein the computing device is directed by the program modules of the computer program to,
- input a first image depicting a first face without an expression, a second image depicting the face in the first image with an expression whose details are to be transferred, and a third image depicting an face without expression different from the first face without expression;
- align the faces in the first, second and third images, thereby creating a correspondence between pixels in the first, second and third aligned images;
- for each corresponding pixel in the first and second images, compute an expression ratio image by dividing the brightness of the face with expression in the second aligned image by the brightness of the face without expression in the first aligned image; and
- create a new image of a face with expression by multiplying the expression ratio image by each corresponding pixel in the third image.

18. The system of claim 17 further comprising a program module to smooth the expression ratio image by smoothing the ratio of the brightness of the second image divided by the brightness of the first image.

19. The system of claim 18 wherein the module for smoothing the first and second image comprises sub-modules to:
- for a given area of pixels of predefined size,
  - average the pixel intensity by averaging the intensity of the surrounding pixels.

20. The system of claim 17 wherein only certain areas of the first, second and third areas are input and processed so that the parts of the newly created image are not changed.

21. The system of claim 19 wherein the second image depicting a face whose facial characteristics are to be transferred is a face of different age, race or gender from the face in the third image.

22. The system of claim 17 wherein the face in the first and second images is a human face and the face in the third image is a synthetic object.

23. The system of claim 17 wherein the face in the first and second images is a synthetic face and the face in the third image is a human face.

24. The system of claim 17 wherein the face in the first and second images is a synthetic face and the face in the third image is a synthetic face.

25. The system of claim 17 wherein the face in the first, second and third images is non-human.

26. A computer-readable medium having computer-executable instructions for transferring the expression of a face in one image to a second face in another image, said computer executable instructions comprising:
- inputting a first RGB image depicting a face without expression, a second RGB image depicting the same face as in the first image with an expression whose details are to be transferred, and a RGB third image depicting a face of different from the first face without expression;
- determining a set of red, green and blue component images for each of said first, second and third RGB images,
- for each said set of red, green and blue component images,
  - aligning the faces in the first, second and third component images, thereby creating a correspondence between pixels in the first, second and third aligned component images;
  - for each corresponding pixel in the first and second component image, computing an expression ratio image by dividing the intensity of the face with expression in the second aligned component image by the intensity of the face without expression in the first aligned component image;
  - creating a new component image of a face with expression by multiplying the expression ratio image by each corresponding pixel in the third component image; and
- adding the red, green and blue new component images of a face with expression to obtain a composite RGB image of a face with expression.

27. The computer-readable medium of claim 26 wherein the input images are the same color but differ only magnitude, and wherein only one color correction ratio is used to correct each component image.

28. A process for compensating for lighting differences between images comprising the process actions of:
- inputting aligned images of the first image, second image and third image depicted in RGB color space and taken under different lighting conditions;
- calculating the component images for each of the first, second and third images in a color space defined by a luminance and a first and second chrominance component;
- for each corresponding pixel in the first and second images, computing a color correction ratio of the luminance component of the second image to the luminance component of the first image;
- for each corresponding pixel in the third image calculating a revised luminance component in said color space defined by a luminance and a first and second chrominance component as the color correction ratio multiplied by the previously calculated luminance component of the third image; and
- converting the component image of the third image in said color space defined by said luminance component and said first and second chrominance component to RGB color space using a standard conversion.

29. The process of claim 28 wherein the component images are defined in YUV color space.

30. The process of claim 29 wherein the component images are defined in YIQ color space.

31. A computer-implemented process for transferring an expression from a face in a first image to a second face in a second image, comprising using a computer to perform the following process actions:
- inputting a first image depicting a face without expression, a second image depicting the same face as in the first image with an expression whose details are to be transferred, and a third image depicting a face of different from the first face without expression;
- aligning the faces in the first and second, thereby creating a correspondence between pixels in the first and second aligned images;
- for each corresponding pixel in the first and second image, computing an expression ratio image by dividing the intensity of the face with expression in the second aligned image by the intensity of the face without expression in the first aligned image;

aligning the expression ratio image with the third image, thereby creating a correspondence between the pixels in the expression ratio image and the third image; and creating a new image of a face with expression by multiplying the expression ratio image by each corresponding pixel in the third image.

32. A computer-implemented process for transferring an expression for a face on a first 3 dimensional face model to a second 3 dimensional face model, comprising using a computer to perform the following process actions:

inputting a first 3D geometric model of a first individual with a neutral expression, a first textured image associated with said first 3D geometric model; a second geometric model of said first individual with an expression, a second textured image associated with said second geometric model; and a third 3D geometric model of a second individual with a neutral expression, a third textured image associated with said third geometric model;

aligning the first, second and third 3D geometric models;

aligning the first, second and third texture images with the aligned first second and third geometric models;

for each corresponding pixel in the first aligned texture image of an individual with a neutral expression and the second aligned texture image of an individual with an expression, compute an expression ratio image by dividing the intensity of the second aligned texture image by the first aligned texture image; and creating a new texture image of said second individual by multiplying the expression ration image by each corresponding pixel in the third aligned texture image.

33. The computer implemented process of claim 32 wherein the process actions of aligning the first, second and third 3D geometric models and the aligning the first, second and third texture images comprises the process actions of:

finding face features of faces in the first, second and third 3D geometric models;

computing the difference vector between the feature positions of the faces in the first and second 3D geometric models;

moving the features of the face in the third 3D geometric model along the difference vector and aligning the face in said third texture image accordingly; and aligning the features in the first and second 3D geometric models with the aligned third 3D geometric model by moving along their respective difference vectors; and aligning the first and second texture images with the first and second geometric models.

34. The computer-implemented process of claim 32 wherein the first and second 3D geometric models model a synthetic face and the third 3D geometric model models a human face.

35. The computer-implemented process of claim 32 wherein the first and second 3D geometric models model a synthetic face and the third 3D geometric model models a synthetic face.

36. The computer-implemented process of claim 32 wherein each face modeled in the first, second and third 3D geometric models is non-human.

37. The computer-implemented process of claim 32 wherein at least one of the first, second and third 3D geometric models is shaded.

* * * * *